(12) United States Patent
Jones

(10) Patent No.: US 6,539,743 B2
(45) Date of Patent: Apr. 1, 2003

(54) TRANSPORT ASSEMBLY FOR TRANSPORTING FREE FLOWING FROZEN PRODUCT AWAY FROM A CRYOGENIC PROCESSOR

(75) Inventor: Stan Jones, Vienna, IL (US)

(73) Assignee: Dippin' Dots, Inc., Paducah, KY (US)

( * ) Notice: Subject to any disclaimer, the term of this patent is extended or adjusted under 35 U.S.C. 154(b) by 0 days.

(21) Appl. No.: 09/898,667

(22) Filed: Jul. 3, 2001

(65) Prior Publication Data

US 2002/0129616 A1 Sep. 19, 2002

Related U.S. Application Data

(60) Provisional application No. 60/275,383, filed on Mar. 13, 2001.

(51) Int. Cl.⁷ .............................................. F25D 25/02
(52) U.S. Cl. .............................. 62/381; 62/303; 198/495
(58) Field of Search .................... 62/303, 381; 198/495

(56) References Cited

U.S. PATENT DOCUMENTS

| 3,089,316 A | * | 5/1963 | Robbins | 62/381 |
| 3,097,501 A | * | 7/1963 | Pappas | 62/381 |
| 3,320,964 A | * | 5/1967 | Tripp | 62/303 |
| 3,756,372 A | * | 9/1973 | Mertens | 198/495 |
| 4,569,204 A | * | 2/1986 | Ott et al. | 62/381 |
| 5,126,156 A | | 6/1992 | Jones | 426/418 |
| 5,355,992 A | * | 10/1994 | Baig et al. | 198/495 |
| 5,664,422 A | | 9/1997 | Jones | 62/64 |
| 5,669,288 A | * | 9/1997 | Zittel et al. | 99/348 |
| 6,000,229 A | | 12/1999 | Jones et al. | 62/74 |
| 6,050,391 A | * | 4/2000 | Terry | 62/303 |
| 6,209,329 B1 | | 4/2001 | Jones et al. | 62/74 |
| 6,223,542 B1 | | 5/2001 | Jones et al. | 62/74 |

* cited by examiner

Primary Examiner—Ronald Capossela
(74) Attorney, Agent, or Firm—Thomas, Kayden, Horstemeyer & Risley

(57) ABSTRACT

A transport assembly for a cryogenic processor having an elongated housing forming a channel for the delivery of a frozen product from an intake end to a discharge end. The system includes a screw-type conveyor disposed within the elongated housing for movement of the frozen product from the intake end to the discharge end. An indirect drive motor assembly is provided and configured to rotate the screw-type conveyor. A nozzle assembly is provided for attachment to the transport assembly at the discharge end, the nozzle assembly being configured to inject wash and rinse solutions into the elongated housing. In addition, a drain line is disposed near the intake end of the elongated housing. The drain line facilitates a clean in place procedure.

23 Claims, 4 Drawing Sheets

TRANSPORT ASSEMBLY FOR TRANSPORTING FREE FLOWING FROZEN PRODUCT AWAY FROM A CRYOGENIC PROCESSOR

CROSS-REFERENCE TO RELATED APPLICATION

The present application claims the benefit of U.S. Provisional Application Ser. No. 60/275,383, filed Mar. 13, 2001, and entitled Transport System for Transporting Free Flowing Frozen Product Away from a Cryogenic Processor.

FIELD OF THE INVENTION

The present invention relates generally to a frozen product preparation apparatus and, more particularly, to a transport assembly for transporting frozen product away from a cryogenic processor.

DESCRIPTION OF THE PRIOR ART

Sales of ice cream and frozen yogurt products have risen dramatically in recent years, and applicants herein have captured a portion of this product market through the development of a unique novelty ice cream, frozen yogurt and ice product in the form of beads. This product, marketed under the trademarks "Dippin' Dots®" and "Ice Cream of the Future®", has become very popular in specialty stores, at fairs and theme parks, and through vending machines.

Applicants have proprietary rights in the method of preparing and storing the product pursuant to U.S. Pat. No. 5,126,156, issued Jun. 30, 1992, herein incorporated by reference, as well as rights associated with improvements pursuant to U.S. Pat. No. 5,664,422, issued Sep. 9, 1997, U.S. Pat. No. 6,000,229, issued Dec. 14, 1999, and U.S. Pat. No. 6,209,329, issued Apr. 3, 2001, each of which is incorporated by reference. As is generally described in those patents, the patented method involves delivering flavored liquid dairy and other alimentary compositions to a feed tray and then dripping the composition into a freezing chamber. The feed tray comprises a plurality of orifices through which liquid composition passes to fall into the freezing chamber, either in the form of droplets or liquid streams, which streams break into droplets before freezing. Each orifice may also have a corresponding feed dropper, which is downwardly disposed in relation to the tray such that the liquid composition passes from the tray through an orifice and then through an associated feed dropper where droplets or liquid stream is formed. The orifices or combination of orifices and feed droppers may hereinafter be referred to collectively as feed assemblies.

The falling droplets of liquid composition freeze rapidly (i.e., flash freeze) in the freezing chamber due to the presence of both gaseous and liquid refrigerant in the area between the orifices and the bottom of the freezing chamber, thereby forming solid beads of flavored ice cream, yogurt or other alimentary products, such as flavored ice. More specifically, droplets of liquid free fall through a gaseous region of the freezing chamber, then pass through the liquid refrigerant. The droplets freeze completely as they pass through the liquid refrigerant, and before reaching the bottom of the freezing chamber. The frozen beads are removed from the freezing chamber and packed for distribution and later consumption.

It should be appreciated that the cryogenic processor used for preparing the above-described beaded ice-cream is a relatively sophisticated apparatus that should be tightly controlled for proper operation. For example, the liquid refrigerant preferably used is liquid nitrogen, which has an extremely high evaporation rate. It is typically desired to maintain approximately 19–21 inches of separation between the surface of the liquid nitrogen and the feed tray. If this separation distance is too small, then the liquid droplets may not have sufficient time during their free-fall from the feed tray to form the desired spherical shape. If the separation distance is too large, then the impact of the droplets with the surface of the liquid nitrogen may become undesirably large. Accordingly, the introduction of liquid nitrogen into the freezing chamber, as well as the rate at which liquid composition passes through the orifices of the feed tray, are closely controlled.

Likewise, the removal and transport of frozen product from the cryogenic processor is also an import aspect. As is known, frozen product passes (by gravity) down through the liquid nitrogen to settle at the bottom of the cryogenic processor. A transport mechanism is then provided to transport the frozen product from the bottom of the cryogenic processor to a discharge point, where it may be packaged for shipping. Generally, this objective is accomplished by way of an upwardly disposed channel having a screw-type conveyor that is rotated to transport frozen product from a lower point, connected to the bottom of the cryogenic processor, to a discharge chute provided at the upper end of the transport channel.

It is important to design and construct the transport assembly so that beaded ice cream product is not crushed during transport, and that deformation of the beaded ice cream product is minimized.

Between ice cream productions (particularly between productions of different flavors), the transport assembly is preferably cleaned to remove all remnants of the previously-produced ice cream, before beginning a new production run. Various problems and shortcomings have been identified in existing systems, with regard to this cleaning process. In one system or approach, the transport system typically has to be partially disassembled or removed from the cryogenic processor. This partial disassembly or removal requires additional time, and therefore limits production capabilities. Prior attempts to clean prior systems without disassembly have resulted in other problems. One example has been the leakage (within the discharge channel) of grease or oil from the drive mechanism, which is located near the upper end of the discharge channel. Such leakage contaminates subsequently produced ice cream product, causing waste and thereby lowering production efficiency.

Accordingly, it is desired to provide an cryogenic processor system for preparing a unique, beaded ice-cream product having an improved transport assembly that may be more readily cleaned and thereby overcome the shortcomings of the prior art.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the these objects, the present invention is generally directed to a transport assembly for transporting frozen product from the base of a freezing chamber of cryogenic processor to a discharge chute, where the frozen product is discharged for packaging. In accordance with a preferred embodiment, the transport assembly includes an elongated housing forming a channel for the delivery of a frozen product from an intake end to a discharge end. A screw-type conveyor is disposed within the elongated housing for movement of the frozen product from the intake end to the discharge end. An indirect drive motor assembly is configured (e.g., through a chain and sprocket, or alternatively through a belt and pulley configuration) to rotate the screw-type conveyor. A nozzle assembly may be provided during a cleaning mode for attachment to the transport assembly at the discharge end, the nozzle assembly being configured to inject wash and rinse solutions into the elongated housing. Finally, a drain line may be disposed near the intake end of the elongated housing, the drain line for facilitating a clean in place procedure.

BRIEF DESCRIPTION OF THE DRAWINGS

The accompanying drawings incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. In the drawings.

DETAILED DESCRIPTION OF THE PREFERRED EMBODIMENT

Figure 1:
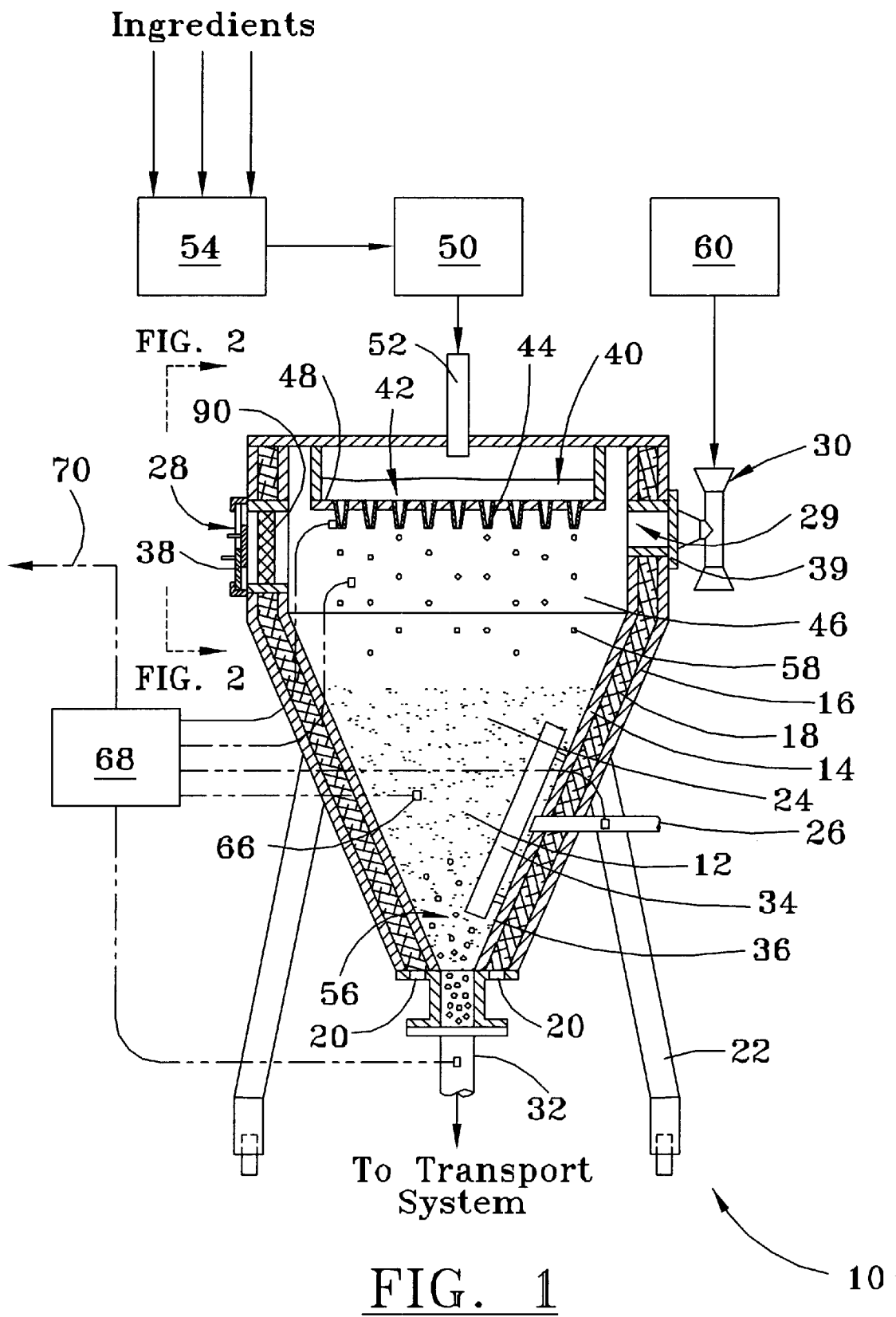
FIG. 1 is a cross-sectional elevation of the improved cryogenic processor.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is now made to FIG. 1 showing an improved cryogenic processor that may be used in conjunction with a transport assembly constructed in accordance with the preferred embodiment of the present invention to produce free-flowing frozen product in the form of small beads. The fundamental method utilized to produce the product is described in detail in U.S. Pat. Nos. 5,126,156, 6,000,229, and 6,209,329 (which have been incorporated herein by reference), but will be summarized below in order to facilitate an understanding of this unique production process. The apparatus as depicted in FIG. 1 enhances the efficiency of the prior art production process and increases product yield.

Cryogenic processor 10 includes a freezing chamber 12 that is most preferably in the form of a conical tank that holds a liquid refrigerant therein. Freezing chamber 12 incorporates an inner shell 14 and an outer shell 16. The inner shell 14 and outer shell 16 may define a vacuum jacket 18 that increases the thermal efficiency of the chamber 12. The freezing chamber 12, as shown in FIG. 1, is a free-standing unit supported by legs 22. Alternatively, the freezing chamber 12 may be disposed in a frame that is specially built to support the processor 10 while in use.

Refrigerant 24, preferably liquid nitrogen in view of its known freezing capabilities, enters the freezing chamber 12 by means of refrigerant inlet 26. Refrigerant 24 entering chamber 12 through inlet 26 is used to maintain a predetermined level of liquid refrigerant in the freezing chamber and must be added to replace refrigerant 24 that is lost by evaporation or by other means incidental to production. Gaseous refrigerant that has evaporated from the surface of the liquid refrigerant 24 in freezing chamber 12 primarily vents to the atmosphere through exit port 29 which cooperates with the vacuum assembly 30, which can be in the form of a venturi nozzle (or through direct suction). Extraction of the frozen beads occurs through product outlet 32 adapted at the base of the freezing chamber 12.

When incoming refrigerant 24 enters the freezing chamber 12 through inlet 26, a swirling or cyclonic motion of refrigerant 24 may form in the freezing chamber 12 depending on the amount of refrigerant 24 allowed to enter through inlet 26 and the flow velocity of the incoming refrigerant 24. This cyclonic motion is not favorable to the production process because the frozen beads awaiting extraction at the bottom of freezing chamber 12 may be swept into the swirling refrigerant and thus prevented them from falling to the bottom of the freezing chamber for collection. A non-uniform beaded product can also be produced in this turbulent environment. This unwanted cyclonic motion of the incoming refrigerant is prevented by baffles 34 mounted to interior surface 36 of inner shell 14. Baffles 34 extend inwardly from interior surface 36 in the vicinity of the refrigerant inlet 26. Additionally, the baffles 34 are oriented so that their lengths are substantially vertical within the freezing chamber 12.

An ambient air inlet port 28 with adjustment doors 38 and exit port 29 with adjustment doors 39 are provided to adjust the level of gaseous refrigerant which evaporates from the surface of the liquid refrigerant 24 so that excessive pressure is not built up within the processor 10 and freezing of the liquid composition in the feed assembly 40 does not occur.

A feed tray 48 receives liquid composition from a delivery source 50. Typically, a pump (not shown) drives the liquid composition through a delivery tube 52 into the feed tray 48. A premixing device 54 allows several compositions, not all of which must be liquid, such as powdered flavorings or other additives of a size small enough not to cause clogging in the feed assembly 40, to be mixed in predetermined concentrations for delivery to the feed tray 48.

It is recognized that in order to create uniformly sized beads 56 of frozen product, uniformly sized droplets 58 of liquid composition are required to be fed through gas diffusion chamber 46 to freezing chamber 12. The feed tray 48 is designed with feed assembly 40 that forms droplets 58 of the desired character. The frozen product takes the form of beads that are formed when the droplets 58 of liquid composition contact the refrigerant vapor in the gas diffusion chamber 46, and subsequently the liquid refrigerant 24 in the freezing chamber 12. After the beads 56 are formed, they fall to the bottom of chamber 12. A transport system connects to the bottom of chamber 12 at outlet 32 to carry the beads 56 to a packaging and distribution network for later delivery and consumption.

In accordance with one aspect of the system, the processor is designed with an incorporated vacuum assembly 30 which can take the form of a venturi. The vacuum assembly 30 cooperates with air inlet 28 and adjustment doors 38 so that an ambient air-flow passes through the inlet 28 and around feed assembly 40 to ensure that no liquid composition freezes therein. This is accomplished by mounting the vacuum assembly 30 and air inlet 28 on opposing sides of the gas diffusion chamber 46 such that the incoming ambient air drawn by the vacuum assembly 30 is aligned with the feed assembly. In this configuration, ambient air flows around the feed assembly warming it to a sufficient temperature to inhibit the formation of frozen liquid composition in the feed assembly flow channels. Air source 60, typically in the form of a blower, is attached to vacuum assembly 30 to provide appropriate suction to create the ambient air flow required.

Figure 2:
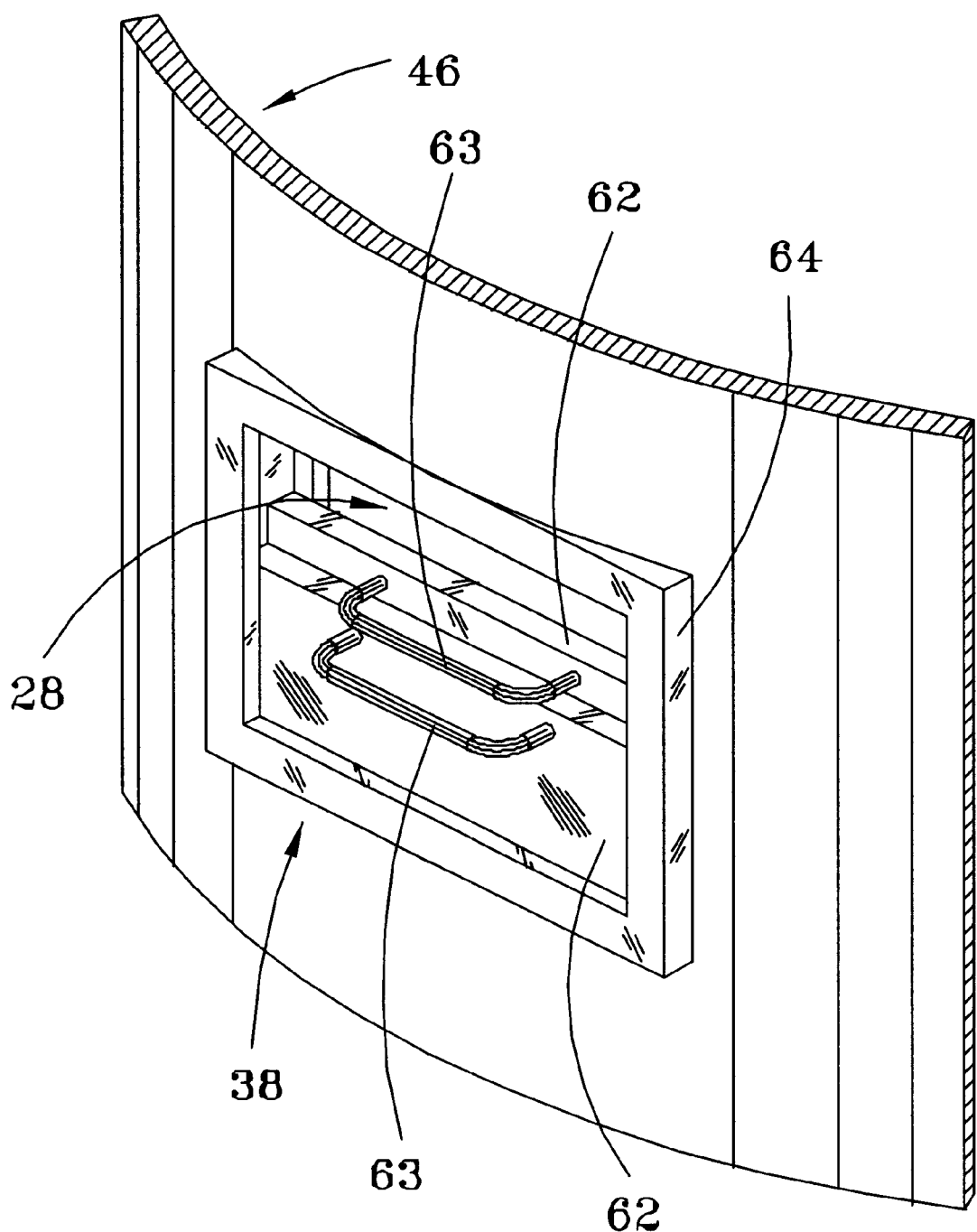
FIG. 2 is a cut-away perspective view of the adjustable air inlet doors.

As mentioned above, air inlet 28 may incorporate adjustment doors 38 for controlling the amount of incoming ambient air. As shown in FIG. 2, the preferred embodiment of the doors 38 is a series of slidable door segments 62 mounted within a frame 64. This configuration accommodates numerous adjustment combinations so that the desired flow rates may be achieved between a full open setting where the doors 38 expose a maximum size inlet opening and a full closed setting where the doors completely block the inlet 28, thereby preventing ambient air flow. It should be recognized by those of ordinary skill in the art that numerous other embodiments of the inlet doors 38 may be used for achieving the desired results, i.e. a variable flow nozzle, or an adjustable inlet vent, to mention but a few.

Figure 3:
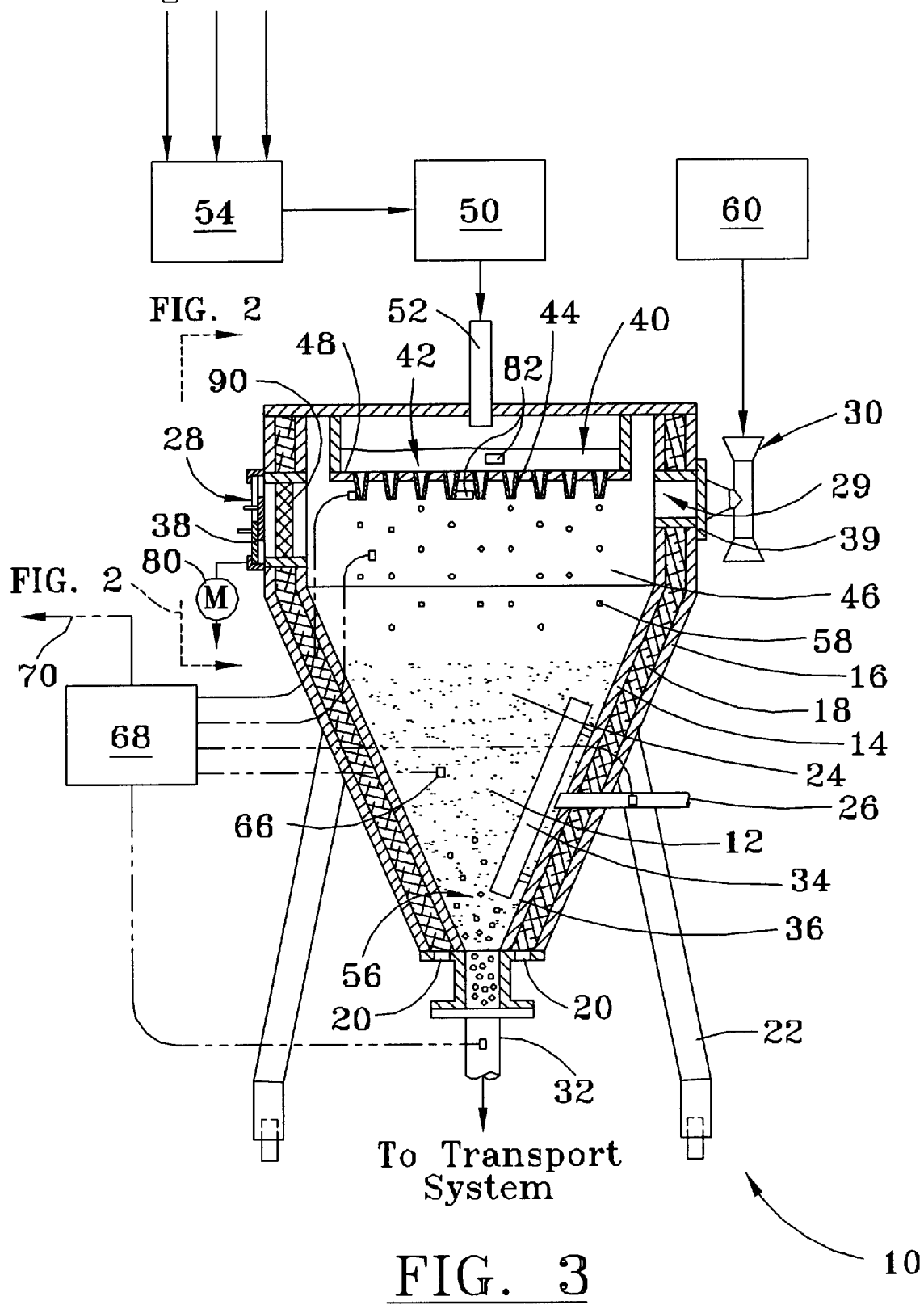
FIG. 3 is a cross-sectional elevation of an improved cryogenic processor, similar to FIG. 1, but further illustrating motorized control of air inlet doors.

In one embodiment, the doors 62 may be manually adjusted. An operator outside the processor 10 may adjust the position of the doors 62 based upon observations, experience, or other factors. In another embodiment, the doors 62 may be automatically adjusted by a motor 80 (see FIG. 3), or other mechanism capable of moving the doors. In such an embodiment, temperature sensors 82 (or other appropriate sensors) may be utilized to sense the temperature surrounding the feed assembly 40. As the temperature falls below a predetermined temperature the motor 80 could adjust the doors 62 to increase the size of the inlet 28. Conversely, as the temperature rises above a predetermined temperature, the motor 80 could adjust the doors 62 to decrease the size of the inlet 28.

In yet another embodiment, the inlet 28 may be held constant and the vacuum source 60 may be adjusted to control the temperature surrounding the feed assembly 40. In such an embodiment, as the temperature 60 falls below a predetermined level, the vacuum source 60 may be controlled to increase the air flow across the droppers 44. Conversely, as the temperature rises above a predetermine temperature, the vacuum source 60 may be controlled to decrease the air flow across the droppers 44.

Further still, the temperature surrounding the feed assembly 40 may be controlled through a controlled combination of the inlet 28 size and the rate of air flow across the droppers 44. That is, temperature control may be implemented through a combination of motor 80 control and vacuum source 60 control.

In yet another embodiment, the motor 80 control and/or the vacuum source 60 control may be based upon the rate of flow liquid composition into the feed assembly. Liquid level sensors may be utilized to sense the level of liquid composition within the feed assembly. Under normal operation (with all droppers 44 completely open), a certain flow rate (of liquid composition into the feed assembly) will be established. If this rate decreases, such a decrease may be presumed to result from a formation of ice within the droppers 44. As a result, the motor 80 may be controlled to increase the size of inlet 28 and/or the vacuum source 60 may be controlled to increase the flow of air across the droppers 44.

Several sensors 66 may be incorporated to measure numerous operating values, such as freezing chamber temperature, refrigerant level, etc. These sensors each provide an input signal to control device 68 which monitors the production process and provides control output signals 70 to facilitate automatic production of the frozen beads. For purposes of illustration, these sensors have been included in FIG. 1 simply as dots. It will be appreciated, however, that the actual structure of the sensors will vary in accordance with the actual implementation.

Numerous benefits result from the use of the above-described system. In contrast to prior art designs where the freezing of liquid composition in the feed assembly created the need to discontinue the production process while the feed assembly was warmed and subsequently cleaned, the above-described system prevents the liquid from freezing in the feed assembly. Thus, the production process may continue uninterrupted.

In accordance with one embodiment of the system, an air intake filter 90 (see FIGS. 1 and 3) may be disposed at the air inlet 28. Although illustrated on the inside of the doors 62, the intake filter 90 may alternatively be positioned on the outside of the doors 62. Although significant measures are taken to ensure that the environment surrounding the processor 10 is maintained in an extremely sanitary fashion, it has been recognized that certain airborne contaminants may nevertheless be present. As a result, the air intake filter 90 is provided to further sanitize and screen the air that is allowed to flow across the feed assembly 40, thereby resulting in a more pure and clean frozen product.

In accordance with yet another aspect of the system, the thermal characteristics of the processor 10 are improved. Preferably, the processor 10 is constructed with a double-wall construction, having an inner wall 14 and an outer wall 16. Previous generation processors have included foam glass insulation between the walls 14 and 16. However, in accordance with one aspect of the invention, a vacuum jacket is instituted to insulate the liquid refrigerant within the processor 10. Accordingly a port (not shown) and vacuum source (not shown) may be provided to evacuate the chamber between the inner wall 14 and outer wall 16. It has been found that such a "vacuum jacket" provides better insulating quality than a foam glass jacket. As a result, the rate at which the liquid refrigerant vaporizes and evaporates is reduced. Thus, a smaller amount of liquid refrigerant is required for the preparation of a given amount of frozen product.

Figure 4:
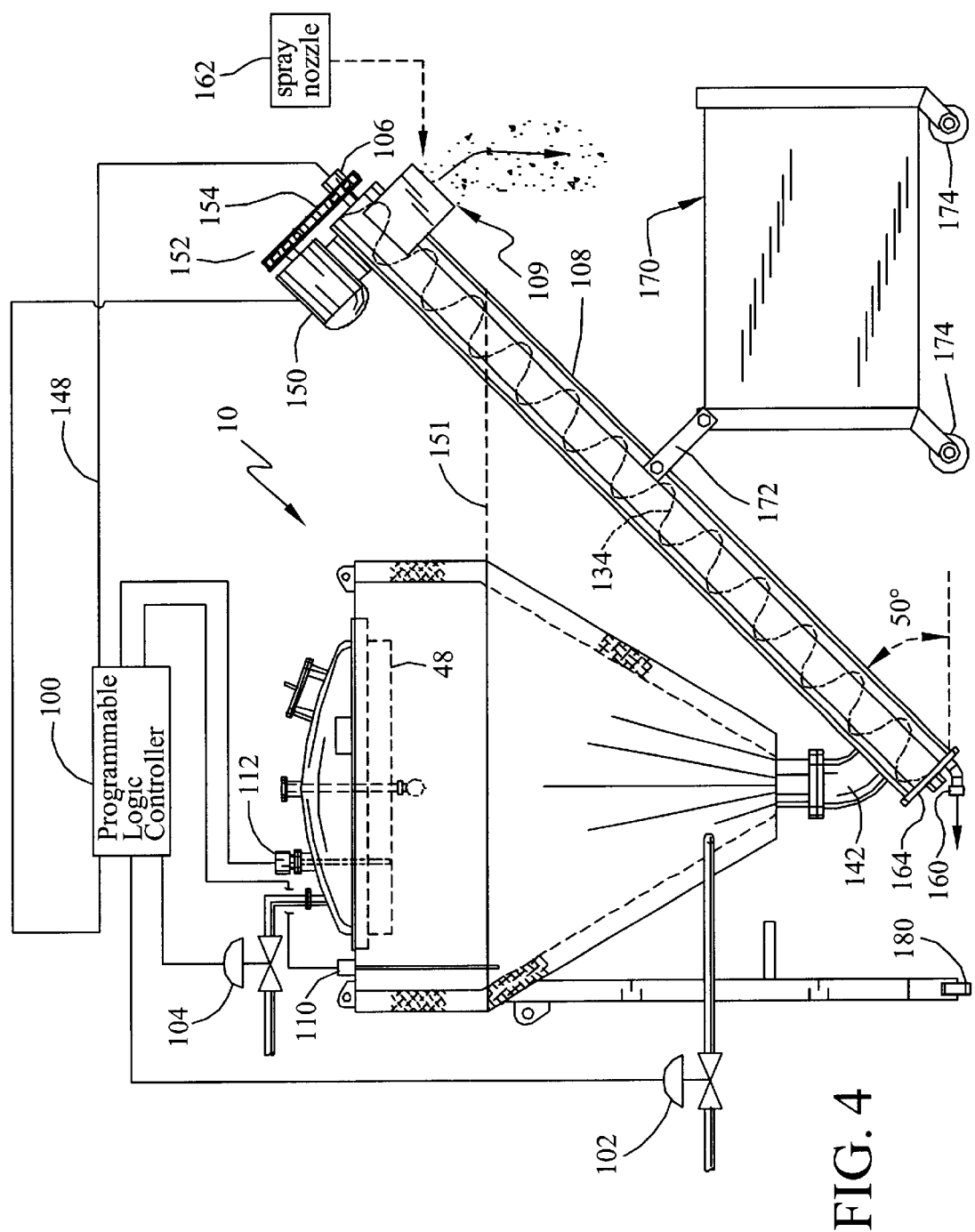
FIG. 4 is a diagram of the improved cryogenic processor illustrating various features and aspects of the improved transport assembly of the present invention.

The cryogenic processor 10 also includes a control system for controlling the operation of the cryogenic processor described above. In this regard, reference is made to FIG. 4. FIG. 4 is a diagram of the cryogenic processor 10 showing various control valves. For simplicity, some of the details of the cryogenic processor illustrated in FIGS. 1–3 have been eliminated from the diagram of FIG. 4. The operation of the control system is computer-controlled, and the flowcharts and logic for controller 100 are described in detail in the Appendix hereto.

Broadly, the controller 100 operates to control the operation of the various valves to regulate both the level of liquid nitrogen in the freezing chamber and the liquid composition that is delivered to the feed tray 48. In one embodiment, the feed tray 48 may be a single tray, for holding a single flavor of liquid composition. There is at least one throttling valve 102 for controlling the introduction of liquid nitrogen into the cryogenic processor 10. Likewise, there is a valve 104 for controlling the introduction of liquid composition into the feed tray 48. Both of these valves are controlled by one or more electrical signals output from the controller 100.

In the illustrated embodiment, the controller 100 also generates an output signal that controls a drive motor 150 for a transport system 108 (also referred to as an auger delivery system). The transport system 108 includes a screw conveyor 134 (internal to the shaft of the transport channel) that carries frozen beads of ice cream from the bottom of the cryogenic processor 10 upward to chute 109, where the beads are output for packaging. As illustrated, the mouth of the chute 109 is preferably vertically above the surface level 151 of the liquid nitrogen. Therefore, liquid nitrogen is separated from the beaded ice cream in the auger delivery system 108.

Specifically, the auger or screw conveyor 134 rotates to move frozen product from the bottom of the transport mechanism 109 to the top of the transport mechanism 109. The transport assembly 109 preferably includes an inlet 142, in the form of an upwardly-disposed neck, to receive frozen product from the bottom of the cryogenic processor 10. As the frozen product is transported upward through the transport assembly 108, it emerges from the liquid nitrogen as it passes the surface level 151. In the final few flights (screw flights) of travel liquid nitrogen drips from the frozen product back down into the pool of liquid nitrogen. Any trace amounts of liquid nitrogen that may be on the outer surface of the beaded ice cream evaporates therefrom before being expelled from the chute 109, as liquid nitrogen has a fast evaporation rate.

The rate of drive motor 150 may be set to depend upon the rate of introduction of liquid composition into the feed tray 48.

In addition to the outputs described above for the controller 100, the controller 100 has several inputs. These include an input indicative of the level of liquid nitrogen in the reservoir of the cryogenic processor 10, and an input indicative of the level of liquid composition in the feed tray 48. The input indicative of the level of liquid nitrogen may be provided through pressure transducer 110, or in other manners that are well known for sensing liquid levels. Preferably, the surface level of the liquid nitrogen is maintained to be approximately 18–22 inches from the bottom of the feed tray 48. As the level approaches a distance of approximately 22 inches, the valve 102 may be controlled to allow the introduction of liquid nitrogen into the reservoir at a greater rate. Likewise, as the level approaches a distance of approximately 18 inches, the valve 102 may be controlled to slow the rate of the introduction of liquid nitrogen into the reservoir. It is preferred to maintain the introduction of liquid nitrogen into the reservoir at a relatively constant rate, to prevent over-agitation of the liquid nitrogen within the reservoir. By minimizing the agitation of the liquid nitrogen, smoother and more-spherical beads of beaded ice cream are obtained.

The input indicative of the level of liquid composition in the feed tray 48 may be provided through a capacitance probe 112, or in other manners that are well known for sensing liquid levels. The higher the level of liquid composition within the feed tray, the greater the rate at which the liquid composition is expelled from the droppers 44 (see FIGS. 1–3) that depend from the feed tray 48. The actual height of the liquid level may depend upon the composition of the mixture that is being frozen, as differing products may have differing viscosities, as well the size of the frozen bead that is desired.

Another input 148 may be provided to the controller 100 in the form of a feedback measure from the auger delivery system 108. That is, a sensor (not specifically shown) may be configured to measure the actual rotational speed of the auger within the transport channel, and this sensed value may be fed back to the controller 100. One location where such a sensor may be placed is at the end of the drive shaft 106 of the transport system.

Certain inventive improvements are reflected in the transport system 108 illustrated in FIG. 4. The improvements include a change from a direct drive system to an indirect drive system. A direct drive system included a motor that was disposed on the end of the drive shaft 106 to directly drive the drive shaft. Systems having a direct drive motor experience shortcomings of oil or grease leaking down the transport shaft during the cleaning process. In the system of the preferred embodiment of the present invention, an indirect drive system is provided, wherein a drive motor 150 is offset from axial alignment from the end of the drive shaft 106, and drives the drive shaft through, for example, a sprocket 152 and chain 154 combination. Such a system avoids the shortcoming of oil or grease leakage during a clean in place procedure.

Another improvement of the system of the present invention is the incorporation of a spray nozzle (illustrated graphically) 162, which is designed to insert into the discharge chute 109, when cleaning. This allows the delivery of appropriate wash and rinse solutions into the upper end of the system. During cleaning, the auger may continue to be rotated by the drive motor 150, to more completely and fully clean the transport shaft and inner housing.

Another improvement of the system of the present invention includes the incorporation of a drain line 160 near the bottom of the transport assembly 108, to provide the wash and rinse solutions a proper port of exit. Although not specifically shown, valves may be provided so that the passage extending between the cryogenic processor and the transport assembly 108 may be blocked during the cleaning process, so no cleaning solution backs up into the cryogenic process. Likewise a valve may be provided in connection with the drain line 160.

In one embodiment, cleaning solution and/or rinse may be pressurized and/or recirculated from the drain 160 to the injection nozzle 162.

Also, the transport assembly is preferable configured to have a removable end that includes a faceplate 164 that may be removed to permit the removal of large pieces of frozen product that may have accumulated near the bottom of the transport assembly, before performing the clean in place process.

It should be appreciated that what has been described above is a much improved transport system that advantageously allows a clean in place procedure. This improved procedures avoids the necessity of disassembling the transport assembly to effect a cleaning process, thereby minimizing the down time of the cryogenic processing system between production runs.

Other features of the preferred embodiment may include Teflon bushings for the auger assembly. In this regard, it has been discovered that Teflon bushings are better able to withstand the liquid nitrogen environment. Another feature may include providing a vacuum jacket around the transport assembly 108 to improve efficiency by maintaining the frozen product at lower temperatures during delivery of the product to a packaging station. In addition, it was found that placement of transport channel at an angle of substantially 50° allows maximum product output from the chute 109 and minimum loss of liquid nitrogen being carried from the system.

As shown, the transport assembly 108 may be provided in connection with a cart 170, which helps support the transport assembly 108. In this regard, the transport assembly 108 may be attached to the cart 170 via a bracket 172. The cart 170 may include wheels 174 to facilitate movement of the transport assembly. Further, wheels 180 may be provided on the support frame of the cryogenic processor 10, to facilitate movement and placement of the entire processing and transport system.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A transport assembly for a cryogenic processor comprising:
    an elongated housing forming a channel for the delivery of a frozen product from an intake end to a discharge end, the elongated housing being configured to receive the frozen product from the cryogenic processor;
    a screw-type conveyor disposed within the elongated housing for movement of the frozen product from the intake end to the discharge end;
    a drive motor assembly configured to rotate the screw-type conveyor, the drive motor being coupled to the screw-type conveyor via a chain and sprocket;
    a nozzle assembly for attachment to the transport assembly at the discharge end, the nozzle assembly being configured to inject wash and rinse solutions into the elongated housing; and
    a drain line disposed near the intake end of the elongated housing, the drain line for facilitating a clean in place procedure.

2. The transport assembly of claim 1, wherein the elongated housing is disposed at an angle of substantially 50° from horizontal.

3. The transport assembly of claim 1, further including a cart that is attached to the transport assembly to assist in the support and movement of the transport assembly.

4. The transport assembly of claim 1, further including a controller having an output connected to the indirect drive motor, the output controlling the rotational speed of the drive motor.

5. The transport assembly of claim 4, wherein the controller includes an input taken from the screw-type conveyor, the input representing a rotational speed of the screw-type conveyor.

6. The transport assembly of claim 1, further including an inlet disposed on the intake end of the transport assembly, the inlet configured to receive frozen product delivered from a cryogenic processor.

7. A transport assembly for a cryogenic processor comprising:
    an elongated housing forming a channel for the delivery of a frozen product from an intake end to a discharge end, the elongated housing being configured to receive the frozen product from the cryogenic processor;
    a screw-type conveyor disposed within the elongated housing for movement of the frozen product from the intake end to the discharge end; and
    a drive motor assembly configured to rotate the screw-type conveyor in an indirect fashion.

8. The transport assembly of claim 7, wherein the drive motor assembly is coupled to the screw-type conveyor via a chain and sprocket.

9. The transport assembly of claim 7, wherein the drive motor assembly is coupled to the screw-type conveyor via a belt and pulley.

10. The transport assembly of claim 7, further including a nozzle assembly for attachment to the transport assembly at the discharge end, the nozzle assembly being configured to inject wash and rinse solutions into the elongated housing.

11. The transport assembly of claim 7, further including a drain line disposed near the intake end of the elongated housing, the drain line for facilitating a clean in place procedure.

12. The transport assembly of claim 7, wherein the elongated housing is disposed at an angle of substantially 50° from horizontal.

13. The transport assembly of claim 7, further including a cart that is attached to the transport assembly to assist in the support and movement of the transport assembly.

14. The transport assembly of claim 7, further including a controller having an output connected to the indirect drive motor, the output controlling the rotational speed of the drive motor.

15. The transport assembly of claim 14, wherein the controller includes an input taken from the screw-type conveyor, the input representing a rotational speed of the screw-type conveyor.

16. A transport assembly for a cryogenic processor comprising:
    an elongated housing forming a channel for the delivery of a frozen product from an intake end to a discharge end, the elongated housing being configured to receive the frozen product from the cryogenic processor;
    means for moving the frozen product from the intake end to the discharge end;
    means for injecting a liquid into the elongated housing near the discharge end; and
    means for draining the liquid near the intake end.

17. The transport assembly of claim 16, further including a drive motor assembly configured to empower the means for moving, wherein the drive motor assembly is coupled to the means for moving via a chain and sprocket.

18. The transport assembly of claim 16, further including a drive motor assembly configured to empower the means for moving, wherein the drive motor assembly is coupled to the means for moving via a belt and pulley.

19. The transport assembly of claim 16, wherein the means for injecting includes a nozzle assembly for attachment to the transport assembly at the discharge end, the nozzle assembly being configured to inject wash and rinse solutions into the elongated housing.

20. The transport assembly of claim 16, wherein the elongated housing is disposed at an angle of substantially 50° from horizontal.

21. The transport assembly of claim 16, further including a cart that is attached to the transport assembly to assist in the support and movement of the transport assembly.

22. The transport assembly of claim 16, further including a controller having an output coupled to the means for moving, the output controlling a rate at which the means for moving moves the frozen product through the elongated housing.

23. The transport assembly of claim 16, further including a removable end and faceplate configured to facilitate the removal of large frozen solids prior to cleaning.

* * * * *